H. D. HATHAWAY.
SAFETY PEDAL ATTACHMENT.
APPLICATION FILED MAR. 20, 1915.
1,174,496.
Patented Mar. 7, 1916.
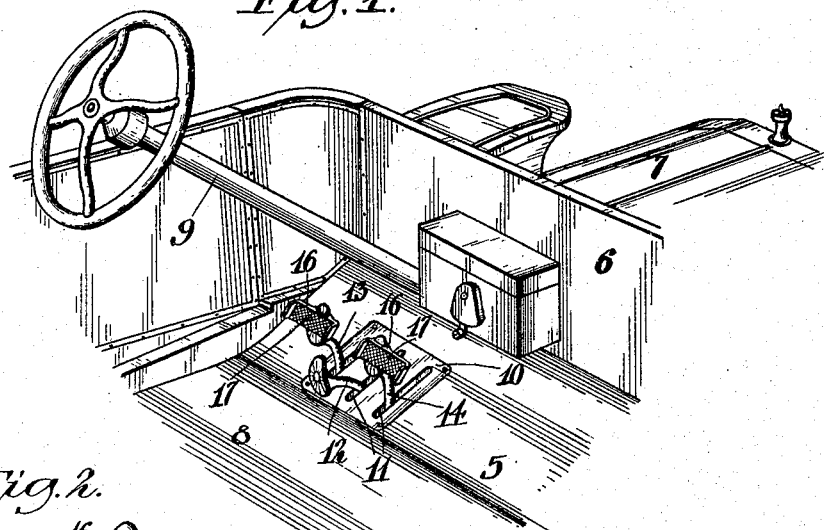
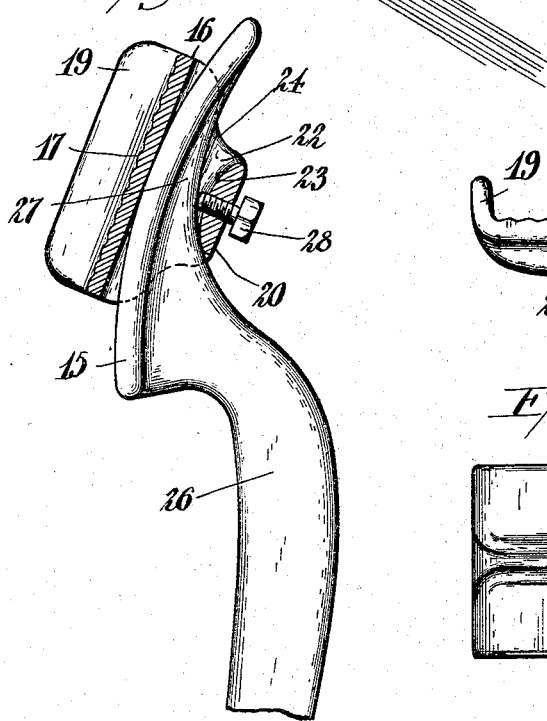
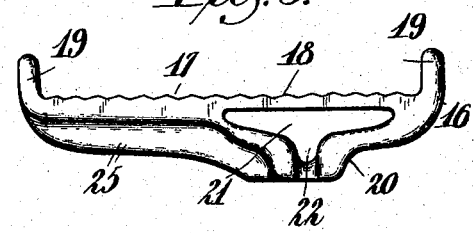
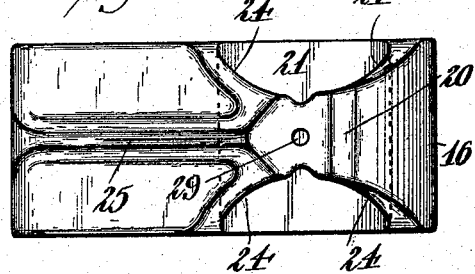
Witness,
Jacob Oberst, Jr.
Harry D. Hathaway, Inventor.
By Emil Neuhardt,
Attorney

# UNITED STATES PATENT OFFICE.

HARRY D. HATHAWAY, OF SILVER SPRINGS, NEW YORK.

SAFETY PEDAL ATTACHMENT.

1,174,496.  Specification of Letters Patent.  Patented Mar. 7, 1916.

Application filed March 20, 1915. Serial No. 15,865.

*To all whom it may concern:*

Be it known that I, HARRY D. HATHAWAY, a citizen of the United States, residing at Silver Springs, in the county of Wyoming and State of New York, have invented certain new and useful Improvements in Safety Pedal Attachments, of which the following is a specification.

My invention relates to improvements in pedal attachments, and more particularly to attachments for the controlling pedals of an automobile which will present proper foot rests.

In certain types of automobiles the pedals are made comparatively small so that it is necessary to keep the feet in constant engagement therewith under muscular strain, since if not so maintained and quick action is required, it may be found difficult to properly place the feet upon the pedals unless done slowly and guided by the eye, which is oftentimes impossible to do in emergency cases where quick action is required. In pedals of this kind the contact surface of the pedal is usually so small in area that when the foot is removed therefrom and it is necessary to quickly actuate the pedal, it oftentimes results in the operator catching only the extreme marginal portion of the pedal and with any attempt to depress the same the foot will slip therefrom and control of the automobile will momentarily be lost. This is also true if the foot is maintained in proper position behind the pedal without straining the muscles to retain the foot in firm contact therewith, since if the foot bears comfortably against the pedal without muscular effort a slight jar of the automobile at the moment quick actuation of one or the other pedal is required will jar the foot from the pedal, and in the attempt to depress the same cause the foot to slip therefrom.

One of the objects of my invention is to provide an attachment for the foot pedal which will have a width between retainer flanges considerably greater than the width of the operator's foot, thus making it easy to find the pedal in case of quick action being required, should the foot be momentarily removed therefrom.

In certain types of automobiles the clutch and brake pedals are arranged side by side in close proximity to each other and the reverse pedal in a plane between the two but at a lower point. Pedals of this type are common on Ford automobiles, and the constant engagement of the feet therewith requires the operator to retain a fixed position, which strains the legs and does not permit relaxing of the muscles. This makes driving of an automobile extremely tiresome and under such conditions the operator is not in condition to respond when emergency requires quick action.

Another object of my invention is to provide attachments for the clutch and brake pedals which are exact counterparts and which are arranged as right and left attachments, the point of connection of each attachment to its pedal being closer to one end of the attachment than the other so that the attachment overhangs the pedal more at one side than at the other. This keeps the attachments of the two last-mentioned pedals properly spaced apart so that the foot can engage the reverse pedal without interference from the attachments when operating said reverse pedal.

A further object is to provide an attachment of this type which is simple in construction, easily applied, and which is strong and durable and insures comfort, due to the fact that the foot cannot slip therefrom, as it is only necessary that the foot rest easy and comfortably against the attachments without muscular effort.

With these objects in view, the invention consists in a pedal attachment having side retainer flanges and pedal receiving openings.

It further consists in a pedal attachment provided with a pedal-receiving opening arranged nearer one end of the attachment than the other so that attachments may be placed on two pedals arranged side by side without one interfering with the other and without any considerable reduction in space between the two.

It further consists in the novel features of construction and in the arrangement and combination of parts to be hereinafter described and particularly pointed out in the subjoined claims.

In the drawings, Figure 1 is a perspective view of a portion of an automobile showing the clutch, brake and reverse pedals with my invention applied to the clutch and brake pedals. Fig. 2 is a side elevation of one of the pedals with my attachment shown in section applied thereto. Fig. 3 is a bottom edge view of the attachment. Fig. 4 is an inverted view of the same.

Like numerals of reference refer to like parts of the several figures, in which—

5 designates an automobile having the usual dash-board 6, the engine hood 7, the foot board or bottom 8, and the steering post 9, all of which are common to all automobiles.

In some types of automobiles, particularly Ford automobiles, the foot board or bottom 8 has a plate 10 secured thereto, the plate being provided with three longitudinally-disposed slots 11 through the center one of which a reverse pedal 2 passes. Through the outer slots, the clutch and brake pedals 13, 14, are passed, each pedal having a head or contact member 15, the contact face of which is somewhat curved. The heads or contact members of these pedals are considerably narrower than the foot of the operator and comparatively short, and the convexity of the same, which is in the direction of their length, makes it necessary to maintain the feet of the operator in contact therewith under muscular strain, since in passing over rough surfaces the foot would otherwise easily be jarred from the pedal, and if it is found that actuation of the pedals is required at such times, control of the automobile would momentarily be lost. Moreover, if in riding over smooth roads the foot is not maintained in contact with the pedals under pressure, which requires straining of the muscles, and the operator's mind is not directed to the foot, he is likely without thought to shift his foot slightly to the right or left and in case of emergency requiring quick action of the pedal, the foot would slip from the pedal in an attempt to depress the same.

As shown in the drawings the clutch and brake pedals are in the same plane transversely and spaced apart a certain distance, while the reverse pedal is in a plane between the clutch and brake pedals and slightly in rear of and beneath the same. The space between said clutch and brake pedals is of such size that in operating the reverse pedal the foot may pass between the two, thus making a compact arrangement of the pedals within easy reach of the operator's feet.

My improved attachment comprises a casting 16 of comparatively light weight and of a width somewhat greater than the width of the operator's foot, it comprising a flat contact member 17 having a roughened upper face 18 and upstanding retainer flanges 19 at opposite side edges. On its under or forward side, said flat member is provided with enlargement 20 in which is formed a pedal-receiving slot or opening 21 through which the head or contact member of the pedal is adapted to be passed, as best shown in Fig. 2. Said enlargement is arranged to one side of the longitudinal center and the opening 21 is of a width slightly greater than the width of the head or contact member 15 of the pedal and has a longitudinal groove 22 formed therein, the bottom of which is made convex, as best shown at 23, Fig. 2. The slot opening 21 and the groove 22 constitute a T-shaped opening for the pedal, the slot or opening 21 being the head portion and the groove 22 the stem portion of said T-shaped opening. The enlargement 20 is made comparatively short at its intermediate point and gradually flares in opposite directions, as at 24, until it is as long as the flat member 18 is wide. A web 25 extends from said enlargement to the distant side edge of said attachment.

It is to be noted that the pedal has its shank 26 continued in a web 27 underneath or in front of the head or contact member 15, said web fitting into the longitudinal groove 22. The attachment is held to the pedal by means of a set screw 28 passed through a tapped opening 29 in the enlargement 20 of the attachment, said screw bearing against the web 27 so as to retain the attachment on the pedal. When the attachment is placed on the clutch pedal 13 at the left, it is arranged so that it overhangs the pedal more at the left hand side than at the right, and the attachment applied to the brake pedal 14 is reversed so that it overhangs said pedal more at the right than at the left, in consequence of which the proper space is maintained between the pedals for allowing actuation of the reverse pedal without interference. By concaving the bottom of the transverse groove 22, as stated, the attachment may be applied to either pedal so that the attachments may be used as right or left attachments without necessitating the making of separate patterns for each. The attachments are therefore exact counterparts and merely reversed on the pedals. By the use of these attachments, quick and positive operation of the pedals is insured and the operator's feet may be maintained comfortably and easy in proper relation to the pedals, ready for instant and positive action without muscular effort. The flanges at the ends of the attachment hold the feet in proper position, assuring comfort, perfect ease and control, and absolute safety, as it is impossible for the feet to slip from the attachment. This relieves the mind of minor cares incident to driving and the muscles are free to act instantly in case of emergency.

Having thus described my invention, what I claim is,—

1. An attachment for an automobile pedal comprising a flat casting having upstanding retainer flanges at opposite side edges and an enlargement on its under or forward side provided with an opening, said opening being arranged in a plane closer to one of said retainer flanges than the other and adapted to receive the pedal, and means for securing said casting to the pedal.

2. An attachment for an automobile pedal comprising a casting having retainer flanges at opposite side edges and a T-shaped opening extending therethrough into which the pedal is fitted, and means to secure said casting to said pedal.

3. An attachment for an automobile pedal comprising a casting having a flat portion provided with flanges at opposite side edges and an enlargement nearer one side edge of said flat portion than the other provided with an opening into which the pedal is adapted to fit, and a set screw threaded into said enlargement and bearing against said pedal to retain the attachment thereon.

4. An attachment for an automobile pedal comprising a casting having a roughened contact surface and retainer flanges at opposite extremities of said contact surface, a T-shaped opening formed longitudinally through said casting and having the extremity of the stem portion of said opening made convex, a pedal having a contact member fitting into the head portion of said T-shaped opening and a web fitting into the stem portion of said T-shaped opening, and a set screw passing through said casting and engaging the web of said pedal.

In testimony whereof I affix my signature.

HARRY D. HATHAWAY.

Copies of this patent may be obtained for five cents each, by addressing the "Commissioner of Patents, Washington, D. C."